United States Patent
Yamano et al.

(10) Patent No.: US 8,311,136 B2
(45) Date of Patent: Nov. 13, 2012

(54) RADIO WAVE GENERATOR, WIRELESS COMMUNICATION SYSTEM, RADIO INTERFERENCE PREVENTION CONTROL METHOD, AND RADIO INTERFERENCE PREVENTION CONTROL PROGRAM

(75) Inventors: Satoru Yamano, Tokyo (JP); Hideaki Tani, Tokyo (JP)

(73) Assignee: NEC Corporation, Tokyo (JP)

( * ) Notice: Subject to any disclaimer, the term of this patent is extended or adjusted under 35 U.S.C. 154(b) by 823 days.

(21) Appl. No.: 12/307,899

(22) PCT Filed: Jul. 3, 2007

(86) PCT No.: PCT/JP2007/063328
§ 371 (c)(1),
(2), (4) Date: Feb. 11, 2009

(87) PCT Pub. No.: WO2008/004562
PCT Pub. Date: Jan. 10, 2008

(65) Prior Publication Data
US 2009/0296854 A1 Dec. 3, 2009

(30) Foreign Application Priority Data
Jul. 7, 2006 (JP) .................................. 2006-188701

(51) Int. Cl.
*H04L 27/00* (2006.01)
(52) U.S. Cl. ........................................ 375/260; 375/295
(58) Field of Classification Search .................. 375/259, 375/260, 295, 296
See application file for complete search history.

(56) References Cited

U.S. PATENT DOCUMENTS
2004/0095895 A1* 5/2004 Barnes .......................... 370/252

FOREIGN PATENT DOCUMENTS
| JP | 04-373341 A | 12/1992 |
| JP | 2000224176 A | 8/2000 |
| JP | 2002300171 A | 10/2002 |
| JP | 2006080741 A | 3/2006 |

OTHER PUBLICATIONS
International Search Report for PCT/JP2007/063328 mailed Oct. 16, 2007.

* cited by examiner

*Primary Examiner* — David B. Lugo

(57) ABSTRACT

The present invention is to provide a wireless communication system that is capable of preventing occurrence of radio interference caused by radio wave used by a radio wave generator without requiring any improvement of existing wireless devices. The wireless communication system of the present invention includes: a radio wave generator (1) that uses at least a radio wave in a frequency band that overlaps a frequency band used by a wireless standard; and wireless devices (AP, STA) each of which uses a radio wave conforming to the wireless standard. The radio wave generator (1) transmits a dummy frame conforming to the wireless standard to the wireless devices near the radio wave generator (1) before generating the radio wave in the same frequency band as the frequency band used by the wireless standard. When the wireless devices (AP, STA) receive the dummy frame, the wireless devices (AP, STA) control themselves to stop using the radio wave in the frequency band that has radio interference caused by the radio wave generated from the radio wave generator (1).

15 Claims, 8 Drawing Sheets

RADIO WAVE GENERATOR, WIRELESS COMMUNICATION SYSTEM, RADIO INTERFERENCE PREVENTION CONTROL METHOD, AND RADIO INTERFERENCE PREVENTION CONTROL PROGRAM

This application is the National Phase of PCT/JP2007/063328, filed Jul. 3, 2007, which claims priority to Japanese Application No. 2006-188701, filed Jul. 7, 2006.

TECHNICAL FIELD

The present invention relates to a radio wave generator, a wireless communication system, a radio interference prevention control method, and a radio interference prevention control program that are capable of preventing occurrence of radio interference caused by a radio wave that is used by the radio wave generator where the radio wave generator uses at least a radio wave in a frequency band that overlaps a frequency band used by a wireless standard.

BACKGROUND ART

Recently, wireless devices that use the ISM (Industry Science Medical) band around 2.4 GHz band have been come into wide use in an accelerated way. The ISM band overlaps the UNII (Unlicensed National Information Infrastructure) and used for wireless LANs.

The ISM band is used for not only the wireless LANs but also Bluetooth, Zigbee, microwave ovens, cordless phones, and the like.

For that reason, when wireless devices (wireless base station, wireless LAN terminal, and the like) are in the process of wireless communication with each other and a radio wave is generated from a radio wave generator (Bluetooth, Zigbee, a microwave oven, a cordless phone, or the like) that uses at least a radio wave in a frequency band that overlaps the frequency band used by the wireless devices, radio interference occurs between the wireless devices and the radio wave generator. As a result, frames may collide against each other or frame resending may delay the transmission, and the transmission quality may be degraded.

To address the problem, a technical document that has been applied prior to the present invention (for example, see Patent Document 1) discloses a wireless LAN device that performs data communication near a microwave oven by using a radio wave in a frequency band near a microwave for a heating purpose generated from the microwave oven, characterized by including: a microwave oven operation detection device that is incorporated in the microwave oven and includes a detection circuit that detects timing of generation of the microwave and a transmission circuit that transmits a signal representing a detection result of the detection circuit; and a plurality of wireless terminal devices each of which performs data communication by using a radio wave, wherein each of the wireless terminal devices includes: a communication circuit that is capable of being switched between a first data communication scheme for performing wireless communication when the microwave oven does not generate the microwave and a second data communication scheme that is capable of performing communication with little interference of the microwave when the microwave oven generates the microwave; a recognition circuit that receives the signal from the transmission circuit of the microwave oven operation detection device and recognizes the timing of generation of the microwave from the microwave oven according to the detection result of the detection circuit; and a control circuit that switches the communication circuit between the first data communication scheme at timing when the microwave oven does not generate the microwave and the second data communication scheme at timing when the microwave oven generates the microwave according to the recognition result of the recognition circuit.

Another document (for example, see Patent Document 2) discloses a wireless LAN system in which a plurality of terminal devices perform data communication each other near a microwave oven by using a radio wave in a frequency band near a microwave for a heating purpose generated from the microwave oven, characterized in that each of the terminal devices includes communication means for communicating in a first data communication scheme when the microwave is not generated and a second data communication scheme when the microwave is generated, and the microwave oven includes: a radio interference model pattern data storage unit for storing radio interference model pattern data corresponding to an interference radio wave generated from the microwave oven; a wireless modem unit for communicating with the terminal devices; and a control unit for controlling the radio interference model pattern data storage unit, the wireless modem unit, microwave oven functions and the like, wherein the microwave oven transmits the radio interference model pattern data corresponding to an interference radio wave to each of the terminal devices immediately before generating the microwave, and each of the wireless terminal devices that receives the data switches to the second data communication scheme that suppresses a noise of an interference radio wave for the received data to be received thereafter by using the radio interference model pattern data.

Yet another document (for example, see Patent Document 3) discloses a home network appliance that includes: an interference source that generates an electromagnetic wave wherein the electromagnetic wave is not used for communication and interferes with wireless communication; storage means for storing interference source information on the interference source; and notification means for transmitting the interference source information, wherein the home network appliance is capable of performing stable wireless communication by alleviating an influence of the interference to the communication.

Patent Document 1: Japanese Patent Laid Open Publication No. 2000-224176
Patent Document 2: Japanese Patent Laid Open Publication No. 2002-300171
Patent Document 3: Japanese Patent Laid Open Publication No. 2006-80741

DISCLOSURE OF THE INVENTION

Problems to be Solved by the Invention

The technique disclosed in Patent Document 1 is such that the microwave oven detects timing of generation of the microwave and transmits the signal representing the detection result to each of the wireless terminal devices. Each of the wireless terminal devices receives the signal representing the detection result from the microwave oven, and uses the first data communication scheme for performing wireless communication at timing when the microwave oven does not generate the microwave and the second data communication scheme that is capable of performing communication with little interference of the microwave at timing when the microwave oven generates the microwave. Accordingly, the technique prevents radio interference from being caused by the microwave that is generated from the microwave oven without requiring the wireless terminal devices to change radio channels.

Since the technique disclosed in Patent Document 1, however, is an invention with an object of performing data communication by selecting the communication scheme that does not cause an error even at timing when the microwave oven generates the microwave, the technique requires each of the wireless terminal devices to have a new function.

Therefore, the technique disclosed in Patent Document 1 does not aim to prevent occurrence of radio interference without requiring any improvement of existing wireless devices.

Patent Document 1 has no description about the microwave oven that transmits a dummy frame conforming to a wireless standard to each of the wireless terminal devices to stop the wireless terminal device to use a radio wave that is to have radio interference caused by the microwave generated from the microwave oven.

Similar to Patent Document 1, the technique disclosed in Patent Document 2 is an invention of providing each of the terminal devices with communication means for communicating in the first data communication scheme when the microwave is not generated and the second data communication scheme when the microwave is generated and performing data communication by selecting the communication scheme that does not cause an error even at timing when the microwave oven generates the microwave.

Therefore, since the technique disclosed in Patent Document 2 requires the terminal devices with a new function, the technique does not aim to prevent occurrence of radio interference without requiring any improvement of existing wireless devices.

The technique disclosed in Patent Document 2 is such that the microwave oven recognizes the radio interference model pattern data corresponding to the radio interference and sends the recognized radio interference model pattern data to each of the terminal devices immediately before generating the microwave, and each of the terminal devices switches to the second data communication scheme that suppresses the noise of the interference radio wave by using the radio interference model pattern data received from the microwave oven.

Therefore, according to the technique disclosed in Patent Document 2, the microwave oven may cause radio interference unless the microwave oven transmits correct radio interference model pattern data to the terminal devices.

Patent Document 2 has no description about the microwave oven that transmits a dummy frame conforming to the wireless standard to each of the terminal devices to stop the terminal device to use a radio wave that is to have radio interference caused by the microwave generated from the microwave oven.

The technique disclosed in Patent Document 3 is such that the home network appliance transmits the interference source information on the interference source to a communication device and controls the communication device to alleviate an influence of the interference to the communication based on the interference source information received from the home network appliance.

Therefore, Patent Document 3 has no description about the home network appliance that transmits a dummy frame conforming to the wireless standard to communication devices to stop the communication devices to use the radio wave that is to have radio interference caused by the interference source of the home network appliance.

In view of the above-described circumstances, an exemplary object of the present invention is to provide a radio wave generator, a wireless communication system, a radio interference prevention control method, and a radio interference prevention control program that are capable of preventing occurrence of radio interference caused by a radio wave that is used by the radio wave generator without requiring any improvement of an existing wireless device, where the radio wave generator uses at least a radio wave in a frequency band that overlaps a frequency band used by a wireless standard as the above-described problem.

Means for Solving the Problems

In order to achieve the object, the present invention has characteristics shown below.

An exemplary aspect of the present invention is a radio wave generator that uses at least a radio wave in a frequency band that overlaps a frequency band used by a wireless standard, characterized by including: dummy frame transmit means that transmits a dummy frame conforming to the wireless standard to a wireless device near the radio wave generator before the radio wave generator generates the radio wave in the frequency band that overlaps the frequency band used by the wireless standard.

An exemplary aspect of the present invention is a wireless communication system including a radio wave generator that uses at least a radio wave in a frequency band that overlaps a frequency band used by a wireless standard, and a wireless device that uses a radio wave conforming to the wireless standard, characterized in that the radio wave generator includes: dummy frame transmit means that transmits a dummy frame conforming to the wireless standard to the wireless device near the radio wave generator before the radio wave generator generates the radio wave in the frequency band that overlaps the frequency band used by the wireless standard, and the wireless device includes: control means that controls to stop using the radio wave in a frequency band that has radio interference caused by the radio wave that is generated from the radio wave generator while the wireless device receives the dummy frame.

An exemplary aspect of the present invention is a radio interference prevention control method performed by a radio wave generator that uses at least a radio wave in a frequency band that overlaps a frequency band used by a wireless standard, characterized in that the radio wave generator performs a dummy frame transmit step of transmitting a dummy frame conforming to the wireless standard to a wireless device near the radio wave generator before generating the radio wave in the frequency band that overlaps the frequency band used by the wireless standard.

An exemplary aspect of the present invention is a radio interference prevention control method performed by a wireless communication system including a radio wave generator that uses at least a radio wave in a frequency band that overlaps a frequency band used by a wireless standard, and a wireless device that uses a radio wave conforming to the wireless standard, characterized in that the radio wave generator performs a dummy frame transmit step of transmitting a dummy frame conforming to the wireless standard to the wireless device near the radio wave generator before generating the radio wave in the frequency band that overlaps the frequency band used by the wireless standard, and the wireless device performs a control step of controlling to stop using the radio wave in a frequency band that has radio interference caused by the radio wave that is generated from the radio wave generator when wireless device receives the dummy frame.

An exemplary aspect of the present invention is radio interference prevention control program executed by a radio wave generator that uses at least a radio wave in a frequency band that overlaps a frequency band used by a wireless standard, characterized by causing the radio wave generator to perform a dummy frame transmitting process of transmitting a dummy frame conforming to the wireless standard to a wireless device near the radio wave generator before the radio wave generator generates the radio wave in the frequency band that overlaps the frequency band used by the wireless standard.

Advantage of the Invention

According to the present invention, occurrence of radio interference caused by a radio wave that is used by the radio wave generator can be prevented without requiring any improvement of an existing wireless device, where the radio wave generator uses at least a radio wave in a frequency band that overlaps a frequency band used by a wireless standard.

BEST MODE FOR CARRYING OUT THE INVENTION

Figure 1:
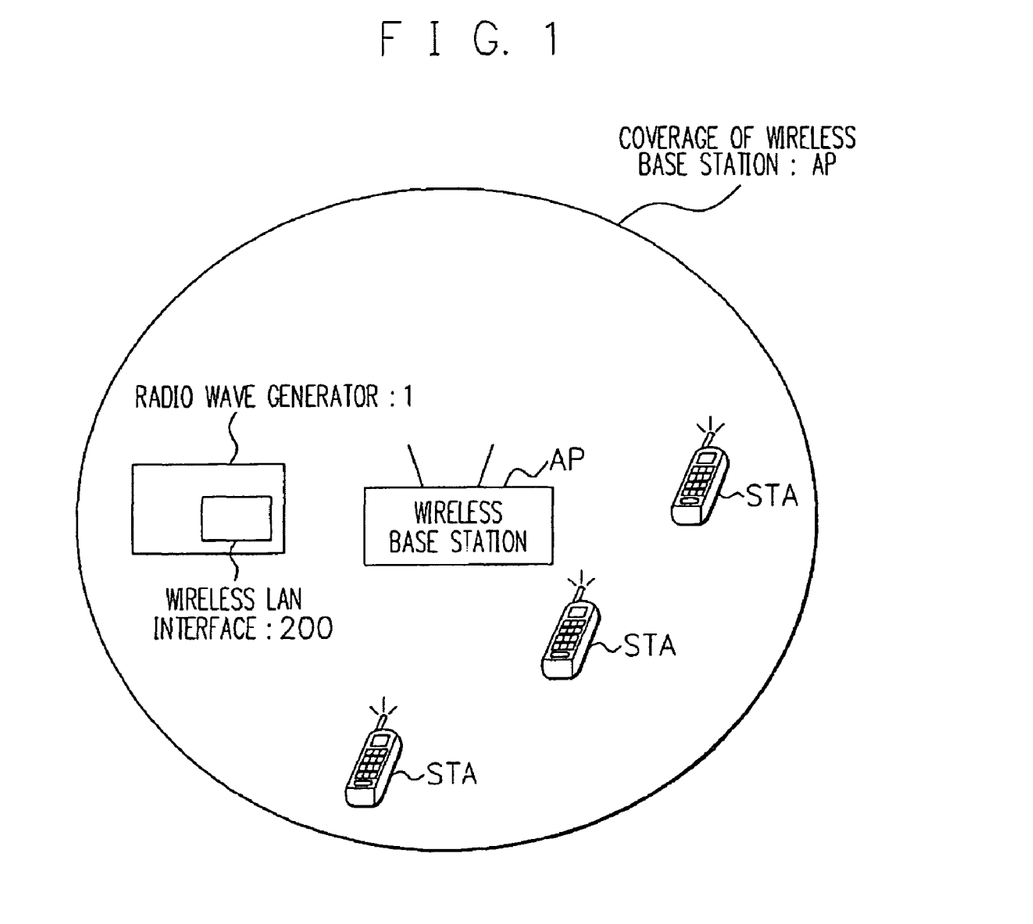
FIG. 1 is a diagram showing a system configuration of a wireless communication system of an exemplary embodiment.

First, the wireless communication system according to the exemplary embodiment will be outlined with reference to FIG. 1.

The wireless communication system according to the exemplary embodiment includes a radio wave generator (1) that uses at least a radio wave in a frequency band that overlaps a frequency band used by a wireless standard; and wireless devices each of which uses a radio wave conforming to the wireless standard (corresponding to a wireless base station AP, and a wireless terminal device STA).

The radio wave generator (1) transmits a dummy frame conforming to the wireless standard to the wireless devices (AP, STA) near the radio wave generator (1) before generating the radio wave in the frequency band that overlaps the frequency band used by the wireless standard. When the wireless devices (AP, STA) receive the dummy frame, the wireless devices (AP, STA) control themselves to stop using the radio wave in the frequency band that has radio interference caused by the radio wave generated from the radio wave generator (1).

In response, the wireless devices (AP, STA) receive the dummy frame transmitted from the radio wave generator (1) as a frame transmitted from another member of the wireless devices (AP, STA), and control themselves to stop using the radio wave in the frequency band that has radio interference caused by the radio wave generated from the radio wave generator (1).

As a result, according to the wireless communication system according to the exemplary embodiment, radio interference caused by a radio wave that is used by the radio wave generator (1) can be prevented without requiring any improvement of the existing wireless devices (AP, STA) where the radio wave generator (1) uses at least a radio wave in a frequency band that overlaps a frequency band used by a wireless standard. The wireless communication system according to the exemplary embodiment will be described below in detail with reference to the accompanying drawings.

First Exemplary Embodiment

<System Configuration of Wireless Communication System>

The system configuration of the wireless communication system according to the exemplary embodiment will be described with reference to FIG. 1.

The wireless communication system according to the exemplary embodiment includes the radio wave generator (1), and a plurality of wireless devices (corresponding to the wireless base station AP, and the wireless terminal device STA).

Each of the wireless devices (AP, STA) uses a radio wave conforming to a wireless LAN standard. The wireless devices (AP, STA) include the wireless base station AP, the wireless LAN terminal (STA), and the like.

As shown in FIG. 1, the wireless communication system according to the exemplary embodiment has the wireless LAN terminals (STA) and the radio wave generator (1) with a wireless LAN interface (200) in the coverage of the wireless base station (AP).

The radio wave generator (1) in the exemplary embodiment may be a device that uses at least a radio wave in the frequency band that overlaps a frequency band used by a wireless LAN (Bluetooth, Zigbee, a microwave oven, a cordless phone and the like).

In the exemplary embodiment, it is assumed that the radio wave generated from the radio wave generator (1) reaches the wireless base station (AP) and the wireless LAN terminal (STA).

<Internal Configuration of Radio Wave Generator: 1>

Now, the internal configuration of the radio wave generator (1) that constitutes the wireless communication system according to the exemplary embodiment will be described with reference to FIG. 2.

Figure 2:
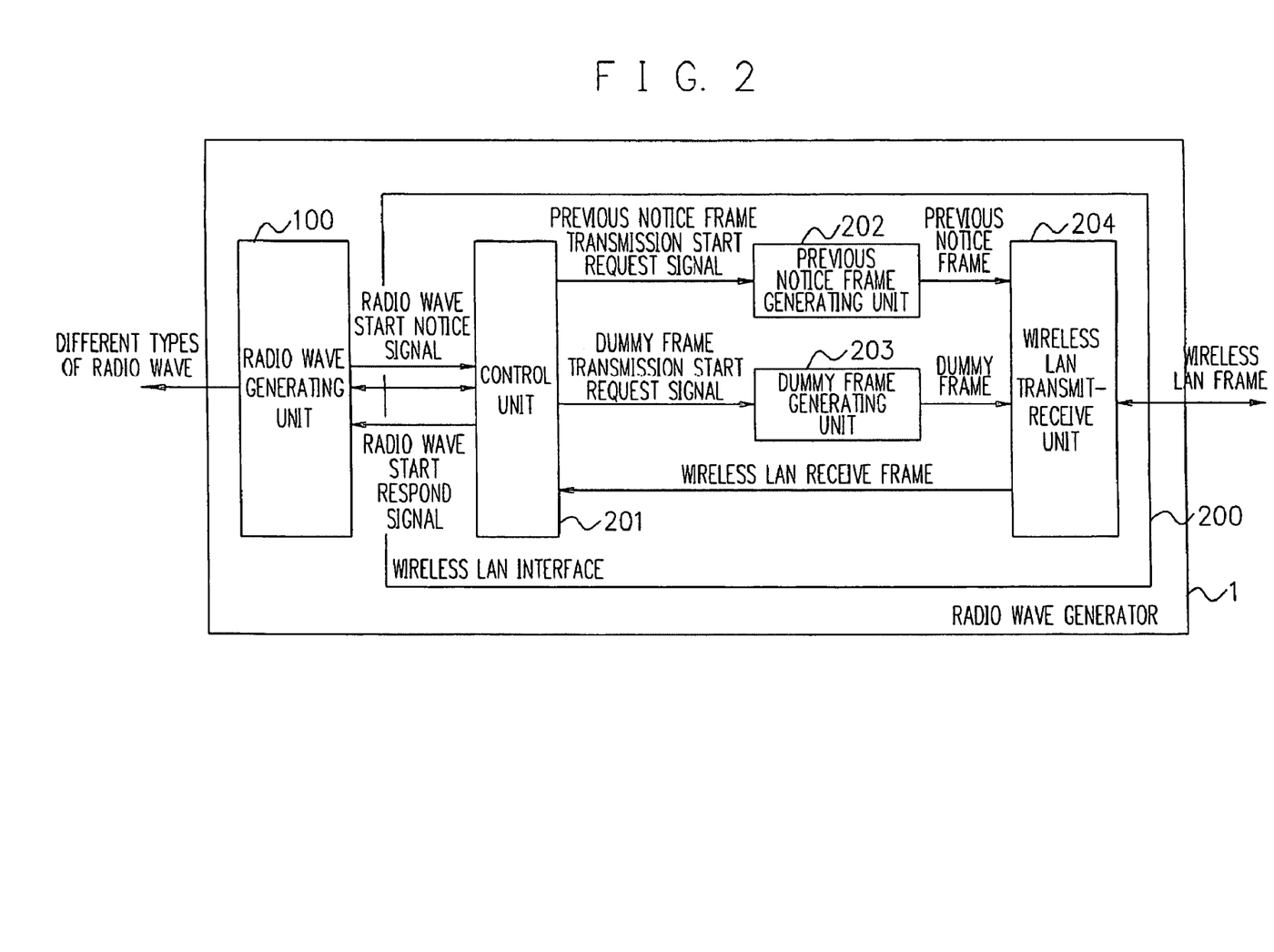
FIG. 2 is a diagram showing an internal configuration of a radio wave generator (1) that constitutes the wireless communication system of the exemplary embodiment.

As shown in FIG. 2, the radio wave generator (1) in the exemplary embodiment includes a radio wave generating unit (100) and the wireless LAN interface (200).

The radio wave generating unit (100) generates a different kind of radio wave from that of wireless LAN standards by using a radio wave in a frequency band that overlaps a frequency band used by the wireless LAN.

The wireless LAN interface (200) transmits and receives a wireless LAN frame conforming to the wireless standard.

The wireless LAN interface (200) in the exemplary embodiment includes a control unit (201), a previous notice frame generating unit (202), a dummy frame generating unit (203), and a wireless LAN transmit-receive unit (204).

The control unit (201) is a function part for taking control over the wireless LAN interface (200).

The control unit (201) controls the wireless LAN interface (200) to prevent interference from being caused by the radio wave generated from the radio wave generating unit (100) by exchanging information with the radio wave generating unit (100).

When the control unit (201) receives a radio wave start notice signal for starting generation of the radio wave from the radio wave generating unit (100), the control unit (201) transmits a previous notice frame transmission start request signal to the previous notice frame generating unit (202).

In response, the previous notice frame generating unit (202) starts to generate a previous notice frame.

Such an operation of starting radio wave generation or the like may trigger the transmission of the radio wave start notice signal from the radio wave generating unit (100) to the control unit (201).

In the case of a microwave oven, depression of the start button to start heating or the like may trigger the transmission.

The condition to trigger the transmission of the radio wave start notice signal from the radio wave generating unit (100) to the control unit (201) is not limited. Any condition may trigger the transmission if only the condition allows the radio wave start notice signal to be transmitted to the control unit (201) before the radio wave generating unit (100) generates the radio wave.

The control unit (201) transmits the dummy frame transmission start request signal to the dummy frame generating unit (203).

In response, the dummy frame generating unit (203) starts to generate a dummy frame.

After transmitting the dummy frame transmission start request signal to the dummy frame generating unit (203), the control unit (201) transmits a radio wave start respond signal to the radio wave generating unit (100). The control unit (201) controls the radio wave generating unit (100) to generate the radio wave when the radio wave generating unit (100) receives the radio wave start respond signal from the control unit (201).

In response, the radio wave generator (1) generates the radio wave after transmitting the dummy frame.

The previous notice frame generating unit (202) is a function part for generating a previous notice frame. The previous notice frame is a frame for previously notifying the wireless devices (AP, STA) near the radio wave generator (1) that a dummy frame is to be transmitted.

When the previous notice frame generating unit (202) receives the previous notice frame transmission start request signal from the control unit (201), the previous notice frame generating unit (202) generates a previous notice frame including information indicating that a dummy frame is to be transmitted and information on the time when the transmission of the dummy frame starts, and transmits the generated previous notice frame to the wireless LAN transmit-receive unit (204).

The dummy frame generating unit (203) is a function part for generating a dummy frame. The dummy frame is a blank frame.

When the dummy frame generating unit (203) receives the dummy frame transmission start request signal from the control unit (201), the dummy frame generating unit (203) generates the dummy frame and transmits the generated dummy frame to the wireless LAN transmit-receive unit (204).

The wireless LAN transmit-receive unit (204) is a function part for transmitting and receiving the wireless LAN frame.

The wireless LAN transmit-receive unit (204) transmits the previous notice frame generated from the previous notice frame generating unit (202) to the wireless devices (AP, STA) near the radio wave generator (1) in the form of wireless LAN frame according to CSMA/CA (Carrier Sense Multiple Access/Collision Avoidance).

Also, the wireless LAN transmit-receive unit (204) transmits the dummy frame generated from the dummy frame generating unit (203) to the wireless devices (AP, STA) near the radio wave generator (1) in the form of wireless LAN frame according to CSMA/CA (Carrier Sense Multiple Access/Collision Avoidance).

The wireless LAN transmit-receive unit (204) broadcasts the previous notice frame and the dummy frame. The wireless LAN transmit-receive unit (204) receives the wireless LAN frames transmitted from the wireless devices (AP, STA) and transmits the received frames to the control unit (201).

The radio wave generator (1) in the exemplary embodiment is provided with the wireless LAN interface (200) shown in FIG. 2. When the radio wave generator (1) receives the radio wave start notice signal from the radio wave generating unit (100), the radio wave generator (1) generates the previous notice frame and transmits the generated previous notice frame to the wireless devices (AP, STA) near the radio wave generator (1) according to CSMA/CA (Carrier Sense Multiple Access/Collision Avoidance).

Accordingly, as the wireless devices (AP, STA) near the radio wave generator (1) receive the previous notice frame transmitted from the radio wave generator (1), the wireless devices (AP, STA) can recognize that a dummy frame is to be transmitted previous to that transmission.

The previous notice frame transmitted from the radio wave generator (1) includes information on the time when the transmission of the dummy frame starts. The wireless devices (AP, STA) can control themselves to switch wireless channels by taking account of information on the start time included in the previous notice frame.

The radio wave generator (1) in the exemplary embodiment controls itself to transmit a dummy frame conforming to the wireless standard to the wireless devices (AP, STA) near the radio wave generator (1) according to CSMA/CA (Carrier Sense Multiple Access/Collision Avoidance) before generating the radio wave from the radio wave generating unit (100) and generate the radio wave from the radio wave generating unit (100) after starting the transmission of the dummy frame.

Accordingly, when the wireless devices (AP, STA) near the radio wave generator (1) receive the dummy frame transmitted from the radio wave generator (1), the wireless devices (AP, STA) suspend the transmission of wireless LAN frames and enter a transmission waiting state.

As the result, the wireless communication system according to the exemplary embodiment can prevent occurrence of radio interference between the radio wave generator (1) and the wireless devices (AP, STA) and prevent occurrence of collision of the wireless LAN frames each other.

The radio wave generator (1) in the exemplary embodiment controls the radio wave generating unit (100) to generate the radio wave after starting the transmission of the dummy frame.

Figure 3:
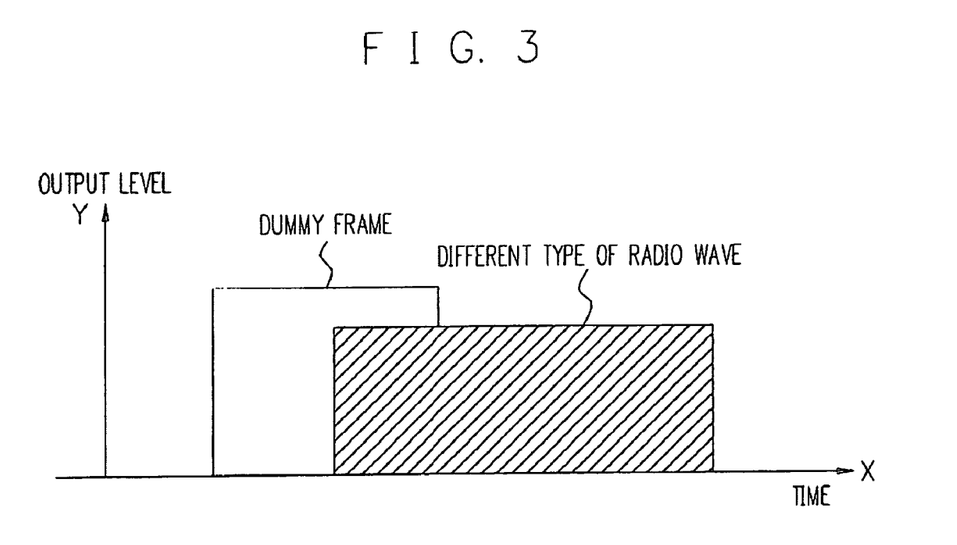
FIG. 3 is a diagram for explaining preferable control timing in controlling the radio wave generator (1) to generate a "radio wave" after transmitting a "dummy frame"

Accordingly, the radio wave generator (1) can generate the "radio wave" sequentially to transmitting the "dummy frame" as shown in FIG. 3. In turn, the wireless devices (AP, STA) near the radio wave generator (1) receive the "dummy frame" and sequentially the "radio wave". As the result, the wireless devices (AP, STA) receive the "dummy frame" and the "radio wave" as the same radio wave. That can make the wireless devices (AP, STA) suspend the transmission of wireless LAN frames and enter the transmission waiting state while the wireless devices (AP, STA) are receiving the "dummy frame" and the "radio wave". In FIG. 3, the Y axis represents the transmission power level of the radio wave generator (1) and the X axis represents the duration in which the radio wave is transmitted from the radio wave generator (1).

A method described below may be a control method for controlling the radio wave generating unit (100) to generate the radio wave after the transmission of the dummy frame is started.

First, the radio wave generating unit (100) transmits the radio wave start notice signal to the control unit (201) as shown in FIG. 2 before starting to generate the radio wave. When the control unit (201) receives the radio wave start notice signal from the radio wave generating unit (100), the control unit (201) transmits the dummy frame transmission start request signal to the dummy frame generating unit (203) to transmit the dummy frame from the radio wave generator (1). After transmitting the dummy frame from the radio wave generator (1), the control unit (201) transmits the radio wave start respond signal to the radio wave generating unit (100). When the radio wave generating unit (100) receives the radio wave start respond signal from the control unit (201), the radio wave generating unit (100) controls itself to generate the radio wave.

Figure 4:
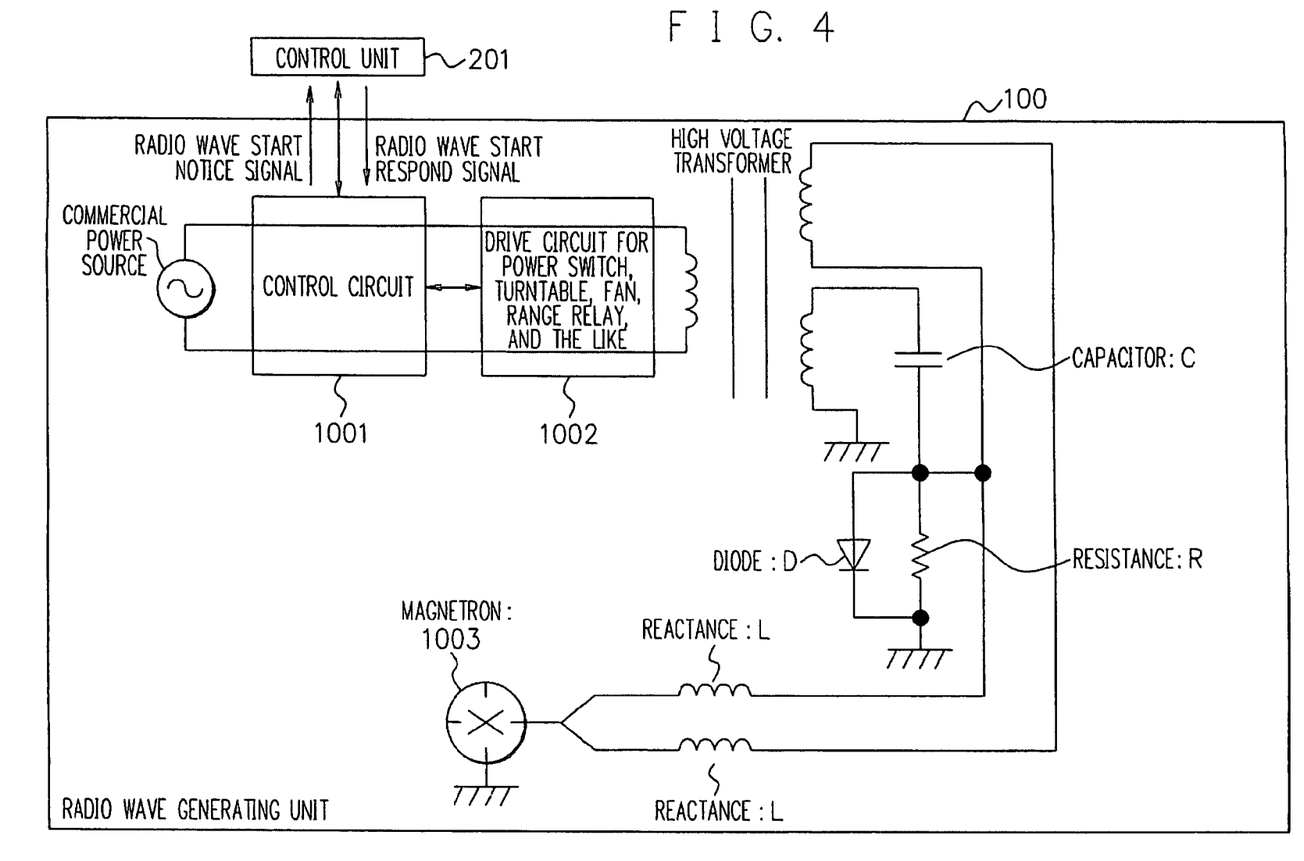
FIG. 4 is a diagram showing an example of circuitry of a radio wave generating unit (100) that constitutes the radio wave generator (1)

When the radio wave generator (1) is a microwave oven, the internal configuration of the radio wave generating unit (100) shown in FIG. 2 is the circuitry shown in FIG. 4.

In that case, a control circuit (1001) that constitutes the radio wave generating unit (100) controls a range relay included in a drive circuit (1002) to control a time when the radio wave is generated from a magnetron (1003), and transmits the radio wave start notice signal to the control unit (201) before starting to generate the radio wave from the magnetron (1003).

When the control circuit (1001) receives the radio wave start respond signal from the control unit (201), the control circuit (1001) controls the range relay included in the drive circuit (1002) to control the magnetron (1003) to generate the radio wave.

In that manner, the control circuit (1001) can control the time when the radio wave is generated from the magnetron (1003). Accordingly, the control circuit (1001) can control the dummy frame conforming to the wireless standard to be transmitted to the wireless devices (AP, STA) near the radio wave generator (1) before the radio wave is generated from the magnetron (1003), and can control the magnetron (1003) to generate the radio wave after the transmission of the dummy frame is started. As the result, the control circuit (1001) can control the "radio wave" to be generated sequentially to the transmission of the "dummy frame" as shown in FIG. 3.

The control circuit (1001) shown in FIG. 4 is a function part for controlling the radio wave generating unit (100).

The drive circuit (1002) is a function part for performing drive control with power supplied from a commercial power source. The drive circuit (1002) includes a power switch relay, a turntable relay, a fan relay, a range relay, and the like. The drive circuit (1002) is controlled by the control circuit (1001) to turn on and off respective relays.

The magnetron (1003) is a function part as a source of generating the microwave that causes the radio interference. The magnetron (1003) is controlled by the range relay included in the drive circuit (1002). The time when the microwave is generated from the magnetron (1003) is controlled by turning on and off the power supply to the magnetron (1003) by the range relay.

The circuitry of the radio wave generating unit (100) shown in FIG. 4 is merely an example and does not limit the circuitry of the radio wave generating unit (100). The radio wave generating unit (100) may be constructed with any circuitry if only the circuitry can control the dummy frame conforming to the wireless standard to be transmitted to the wireless devices (AP, STA) near the radio wave generator (1) before the radio wave is generated from the radio wave generating unit (100) and control the radio wave to be generated from the radio wave generating unit (100) after the transmission of the dummy frame is started.

(Radio Interference Prevention Control Method)

Now, a series of control operations in the wireless communication system of the exemplary embodiment will be described with reference to FIG. 5.

First, the control unit (201) determines whether the radio wave start notice signal has been transmitted from the radio wave generating unit (100) or not (step S1). When the control unit (201) determines that the radio wave start notice signal has been transmitted from the radio wave generating unit (100) (step S1/Yes), the control unit (201) controls the previous notice frame including information indicating that a dummy frame is to be transmitted and information on the time when the transmission of the dummy frame starts to be generated, and controls the generated previous notice frame to be transmitted to the wireless devices (AP, STA) near the radio wave generator (1) in the form of wireless LAN frame according to CSMA/CA (Carrier Sense Multiple Access/Collision Avoidance) (step S2).

Accordingly, the radio wave generator (1) transmits the previous notice frame including information indicating that a dummy frame is to be transmitted and information on the time when the transmission of the dummy frame starts to the wireless devices (AP, STA) near the radio wave generator (1).

When the wireless devices (AP, STA) receive the previous notice frame transmitted from the radio wave generator (1), the wireless devices (AP, STA) determine whether or not to switch the wireless channels being used by the wireless devices (AP, STA) based on the data communication types being used by the wireless devices (AP, STA) when the wireless devices (AP, STA) receive the previous notice frame and information on the start time included in the previous notice frame received by the wireless devices (AP, STA) (step S3).

When a wireless device (AP, STA) determines to switch the wireless channels (for example, when the wireless device is in the process of real-time communication) (step S3/Yes), the wireless device (AP, STA) performs switch control on the wireless channel to switch the currently used wireless channel to another wireless channel, and continues with the data communication that has been in the process before the channel switch by using the wireless channel after the channel switch (steps S20, S21).

When a wireless device (AP, STA) determines not to switch the wireless channels (for example, when the wireless device is in the process of non-real-time communication) (step S3/No), the wireless device (AP, STA) does not perform the switch control on the wireless channel so that the radio wave generator (1) and the wireless devices (AP, STA) share the radio band according to CSMA/CA of the wireless LAN.

Next, the control unit (201) controls the dummy frame, which is blank, to be generated, and the generated dummy frame to be transmitted to the wireless devices (AP, STA) near the radio wave generator (1) in the form of wireless LAN frame according to CSMA/CA (Carrier Sense Multiple Access/Collision Avoidance) (step S4).

Accordingly, the radio wave generator (1) transmits the dummy frame to the wireless devices (AP, STA) near the radio wave generator (1).

The control unit (201) controls the radio wave to be generated from the radio wave generating unit (100) after the transmission of the dummy frame is started (step S5/Yes).

Accordingly, the radio wave generator (1) generates the radio wave after starting the transmission of the dummy frame (step S6).

When the wireless device (AP, STA) does not perform switch control on the wireless channels at step S3 (step S3/No), the wireless device (AP, STA) receives the dummy frame transmitted from the radio wave generator (1).

In that case, when the wireless device (AP, STA) receives the dummy frame, the wireless device (AP, STA) controls itself to suspend the transmission of wireless LAN frames thereafter and to enter the transmission waiting state (step S7).

Accordingly, the wireless device (AP, STA) can prevent the occurrence of collision of the wireless LAN frames by preventing the occurrence of radio interference between the radio wave generator (1) and the wireless device (AP, STA).

The wireless device (AP, STA) keeps suspending the transmission of wireless LAN frames, while the wireless device (AP, STA) is receiving the radio wave generated from the radio wave generator (1) after receiving the dummy frame. When the wireless device (AP, STA) determines that the radio wave generated from the radio wave generator (1) has not been received any more, the wireless device (AP, STA) resumes the frame transmission (steps S10, 11).

As described above, when the start of the radio wave generation is controlled, the radio wave generator (1) in the exemplary embodiment generates the previous notice frame including information indicating that a dummy frame is to be transmitted and information on the time 6 when the transmission of the dummy frame starts, and transmits the generated previous notice frame to the wireless devices (AP, STA) near the radio wave generator (1) in the form of wireless LAN frame according to CSMA/CA (Carrier Sense Multiple Access/Collision Avoidance).

Accordingly, when the wireless devices (AP, STA) receive the previous notice frame, the wireless devices (AP, STA) performs switch control on whether or not to switch the wireless channels based on the information on the start time included in the previous notice frame.

Then, the radio wave generator (1) controls itself to transmit the dummy frame conforming to the wireless standard to the wireless devices (AP, STA) near the radio wave generator (1) according to CSMA/CA (Carrier Sense Multiple Access/Collision Avoidance), and generate the radio wave from the radio wave generating unit (100) after starting the transmission of the dummy frame.

Accordingly, the wireless devices (AP, STA) keep suspending the transmission of wireless LAN frames and enter the frame transmission waiting state, while the wireless devices (AP, STA) are receiving the dummy frame transmitted from the radio wave generator (1) and the radio wave generated from the radio wave generating unit (100).

As the result, the wireless devices (AP, STA) can prevent the occurrence of collision of the wireless LAN frames by preventing the occurrence of radio interference between the radio wave generator (1) and the wireless devices (AP, STA).

Figure 5:
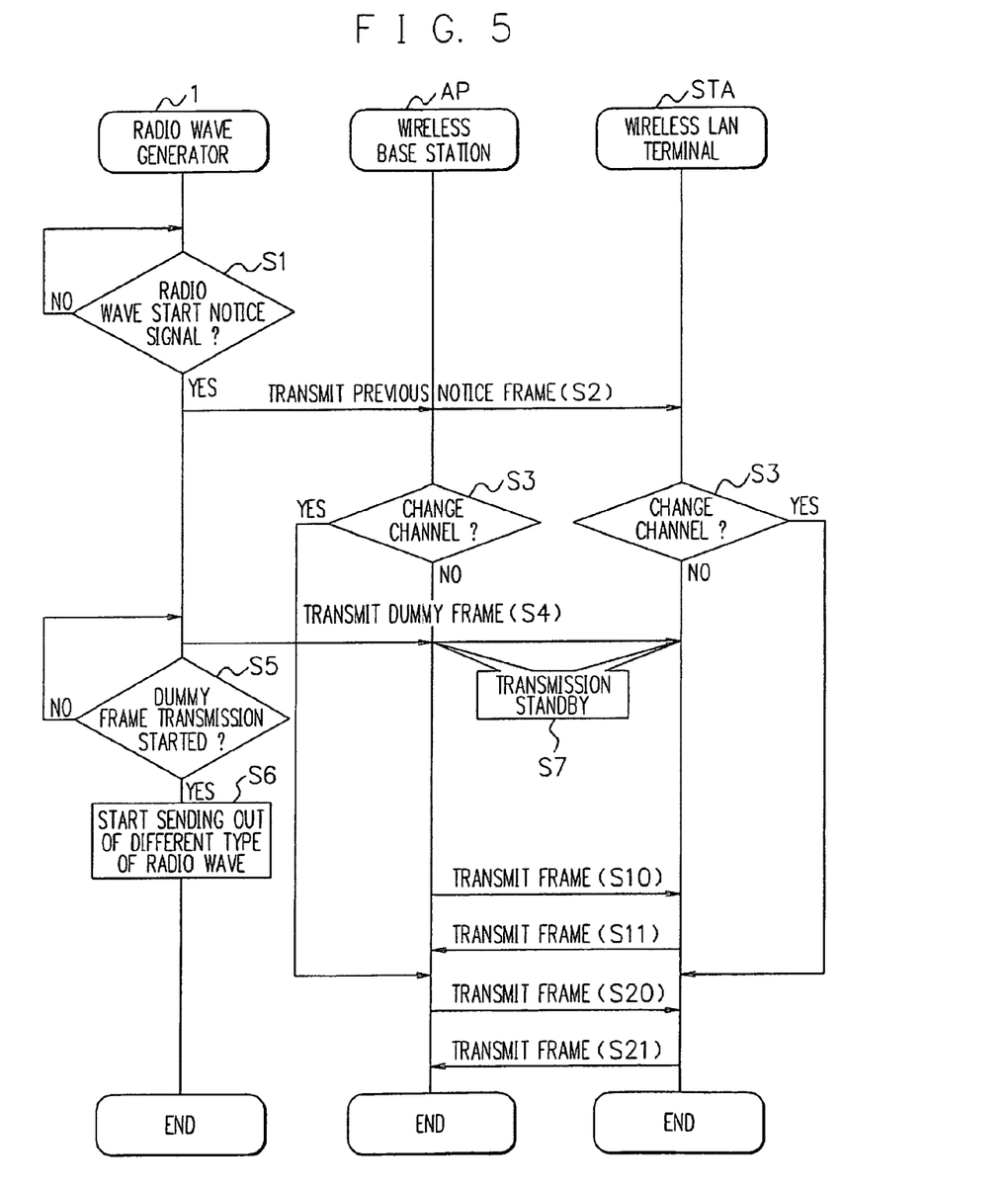
FIG. 5 is a sequence chart showing a series of control operations in the wireless communication system of the first exemplary embodiment.

Although the radio wave generator (1) transmits the previous notice frame including the information indicating that a dummy frame is to be transmitted and the information on the time when the transmission of the dummy frame starts to the wireless devices (AP, STA) at the above-described step S2 shown in FIG. 5, the radio wave generator (1) may transmit the previous notice frame including information on the frequency band of the radio wave generated from the radio wave generator (1) or on the wireless channel corresponding to the frequency band to the wireless devices (AP, STA).

Accordingly, when the wireless devices (AP, STA) receive the previous notice frame from the radio wave generator (1), the wireless devices (AP, STA) can recognize the frequency band of the radio wave generated from the radio wave generator (1) or the wireless channel corresponding to the frequency band based on the information on the frequency band or on the wireless channel included in the previous notice frame.

As the result, the wireless devices (AP, STA) can switch to a wireless channel through which no radio interference is to be caused by the radio wave generated from the radio wave generator (1) based on the information on the frequency band or on the wireless channel included in the previous notice frame when the wireless devices (AP, STA) performs switch control on the wireless channels.

Although the radio wave generator (1) transmits the previous notice frame to the wireless channels (AP, STA) at the above-described step S2 shown in FIG. 5, the radio wave generator (1) may be adapted not to transmit the previous notice frame in the case in which the radio wave generator (1) needs not to make the wireless devices (AP, STA) perform any channel switch.

Second Exemplary Embodiment

Now, the second exemplary embodiment will be described.

In the wireless communication system of the first exemplary embodiment, the radio wave generator (1) broadcast the previous notice frame at step S2 shown in FIG. 5.

Accordingly, when the wireless devices (AP, STA) receive the previous notice frame transmitted from the radio wave generator (1), the wireless devices (AP, STA) do not transmit respond frames to the radio wave generator (1).

As the result, the radio wave generator (1) of the first exemplary embodiment cannot recognize whether the previous notice frame has reached the wireless devices (AP, STA) or not.

Figure 6:
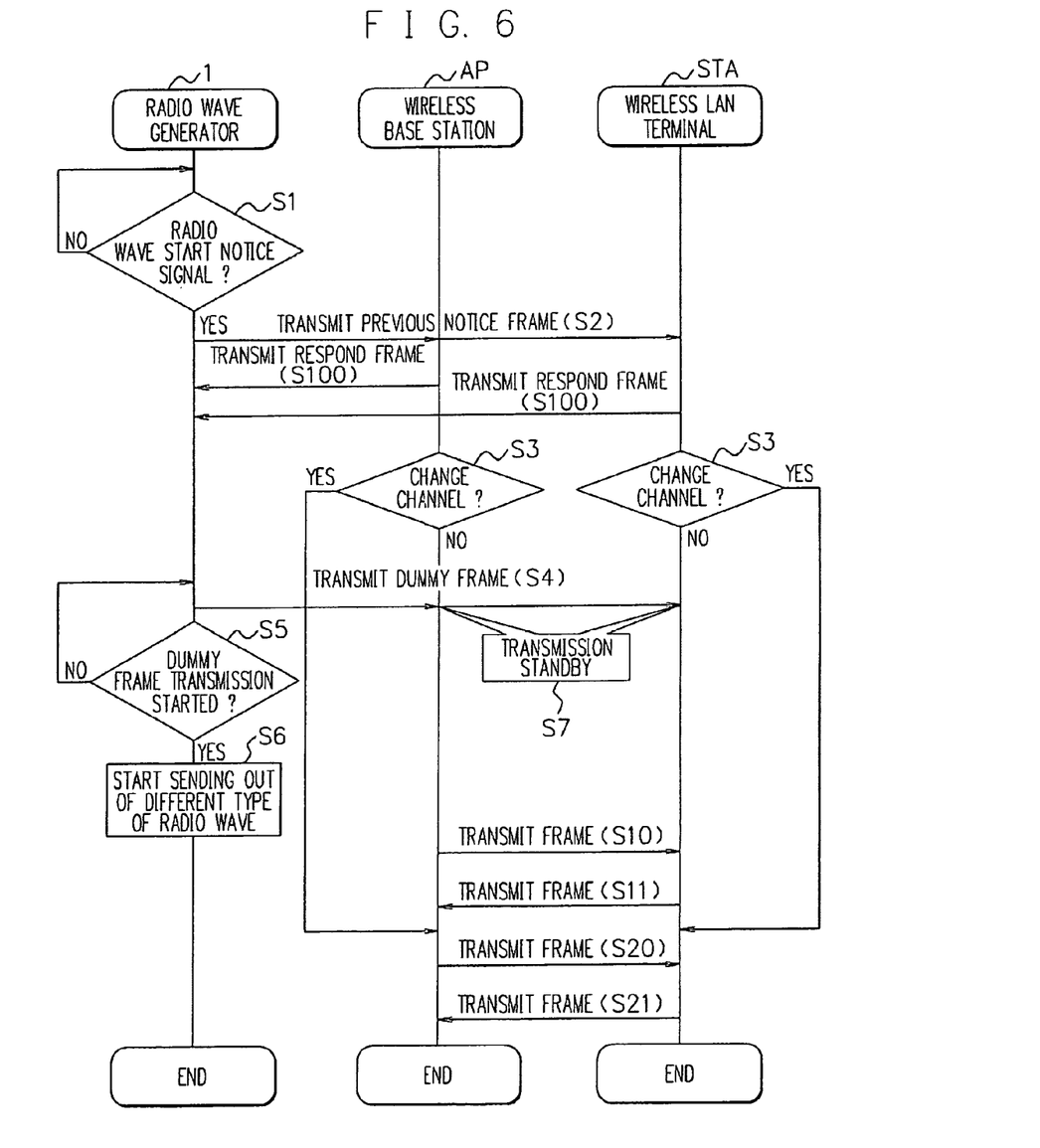
FIG. 6 is a sequence chart showing a series of control operations in the wireless communication system of the second exemplary embodiment.

To address that shortcoming, in the wireless communication system of the second exemplary embodiment, when the wireless devices (AP, STA) receives the previous notice frame transmitted from the radio wave generator (1), the wireless devices (AP, STA) is characterized by explicitly transmitting respond frames to the radio wave generator (1) as shown in FIG. 6 (step S100).

Accordingly, the radio wave generator (1) of the second exemplary embodiment transmits the previous notice frame to the wireless devices (AP, STA), and then receives the respond frames from the wireless devices (AP, STA) that have received the previous notice frame. As the result, the radio wave generator (1) can recognize whether the previous notice frame has reached the wireless devices (AP, STA) or not.

The radio wave generator (1) of the exemplary embodiment controls itself to start transmitting the dummy frame after recognizing that the previous notice frame has reached the wireless devices (AP, STA) as the radio wave generator (1) receives the respond frames from the wireless devices (AP, STA).

Therefore, the radio wave generator (1) does not start transmitting the dummy frame until the switch control on the wireless channels has been completed in the wireless devices (AP, STA).

Accordingly, the wireless communication system of the exemplary embodiment can prevent the occurrence of collision of the wireless LAN frames without fault by preventing the occurrence of radio interference between the radio wave generator (1) and the wireless devices (AP, STA) without fault.

Since the above-described exemplary embodiments are preferable exemplary embodiments of the present invention, the scope of the present invention is not limited to the above-described exemplary embodiments. Those skilled in the art can make various modifications by making corrections and substitutions to the above-described exemplary embodiments without departing from the spirit of the present invention.

Figure 7:
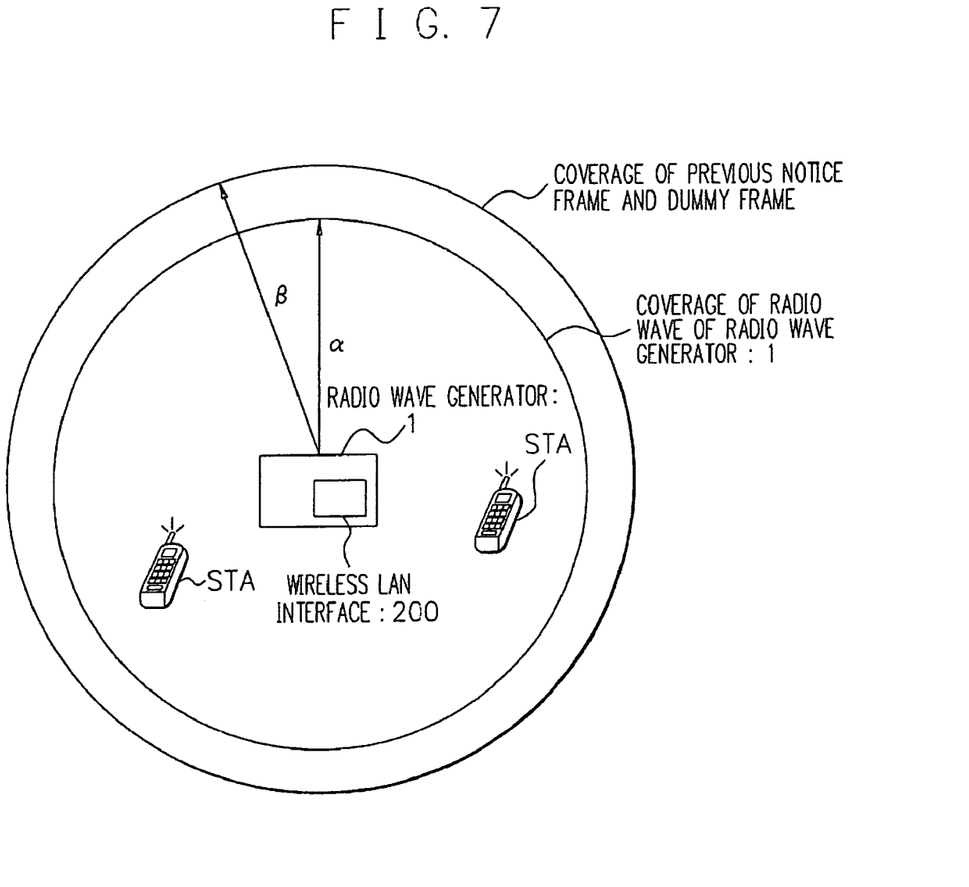
FIG. 7 is a diagram showing relationship between coverage of a previous notice frame and a dummy frame transmitted from the radio wave generator (1) and coverage of a radio wave generated from the radio wave generator (1)

For example, in the above-described exemplary embodiments, the coverage of the previous notice frame and the dummy frame that are transmitted from the radio wave generator (1) is preferably equivalent to or larger than the coverage of the radio wave that is generated from the radio wave generator (1) as shown in FIG. 7.

It is assumed, for example, that the coverage of the radio wave generated from the radio wave generator (1) is denoted by $\alpha$ and the coverage of the previous notice frame and the dummy frame that are transmitted from the radio wave generator (1) is denoted by $\beta$, as shown in FIG. 7.

In that case, the radio wave generator (1) controls the previous notice frame and the dummy frame to cover a range equivalent to or larger than the coverage of the radio wave that is generated from the radio wave generator (1) by adjusting the transmission power level for the previous notice frame and the dummy frame to satisfy $\alpha \leq \beta$.

Accordingly, the radio wave generator (1) can transmit the previous notice frame and the dummy frame to all the wireless devices (AP, STA) within the coverage: a of the radio wave that is generated from the radio wave generator (1).

As the result, the radio wave generator (1) can prevent the occurrence of collision of the wireless LAN frames without fault by preventing the occurrence of radio interference between all the wireless devices (AP, STA) within the coverage: a of the radio wave that is generated from the radio wave generator (1) and the radio wave generator (1) without fault.

In the above-described exemplary embodiment, the radio wave generating unit (100) transmits the radio wave start notice signal to the control unit (201) as shown in FIG. 2 before starting to generate the radio wave. When the control unit (201) receives the radio wave start notice signal from the radio wave generating unit (100), the control unit (201) transmits the dummy frame transmission start request signal to the dummy frame generating unit (203) to transmit the dummy frame from the radio wave generator (1). After transmitting the dummy frame from the radio wave generator (1), the control unit (201) transmits the radio wave start respond signal to the radio wave generating unit (100). When the radio wave generating unit (100) receives the radio wave start respond signal from the control unit (201), the radio wave generating unit (100) controls itself to generate the radio wave.

In the exemplary embodiment, however, the method is not limited to that described above and such a method as shown in FIG. 8(C), for example, can also be applied if only the control unit (201) can previously recognize the radio wave generating duration during which the radio wave is generated from the radio wave generating unit (100). The method shown in FIG. 8(C) is control for transmitting the dummy frame a predetermined time ($\alpha$) before the radio wave is generated from the radio wave generating unit (100).

Figure 8:
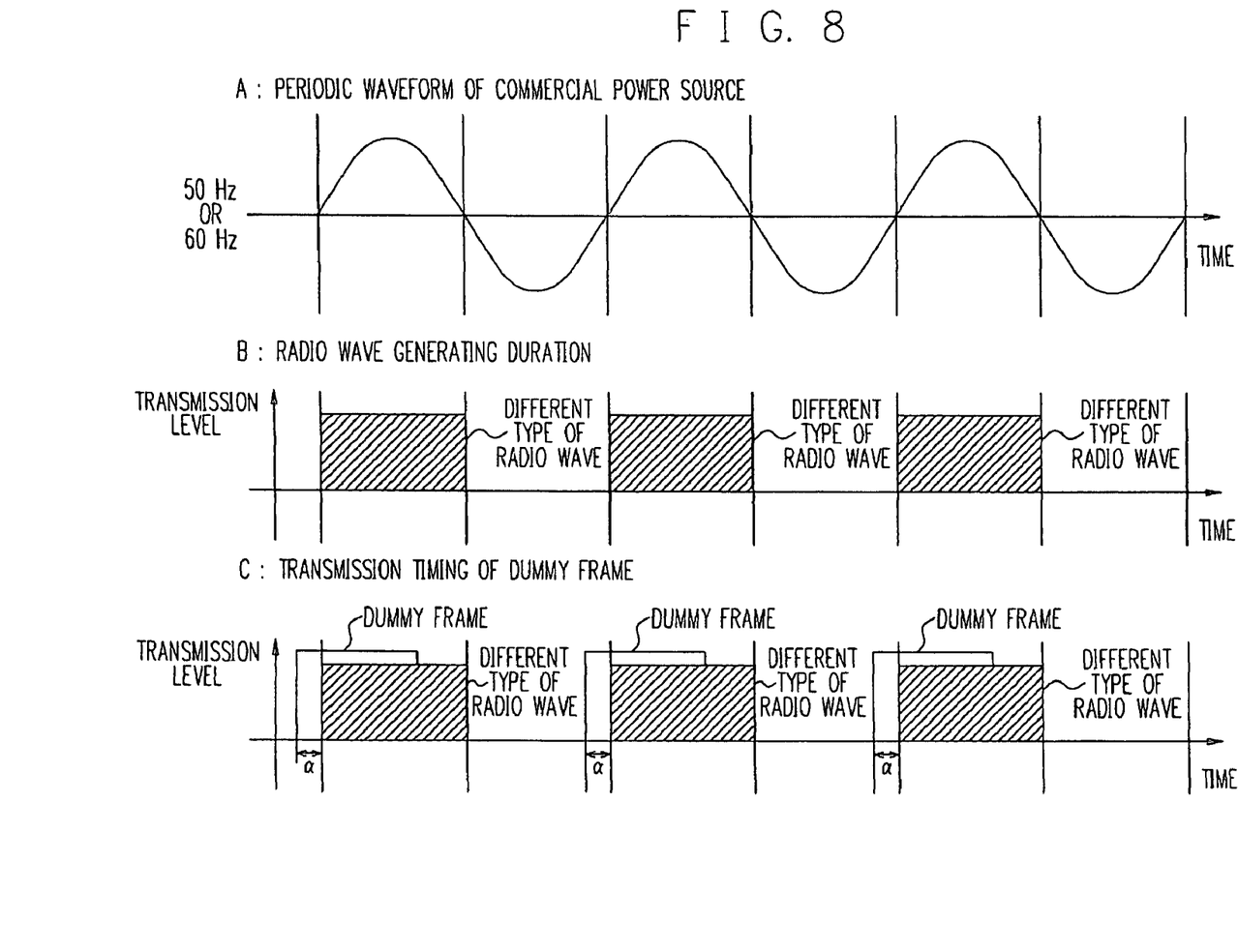
FIG. 8 is a diagram for explaining an example of a case of previously recognizing radio wave generating duration during which the radio wave generator (1) generates the "radio wave" and controlling the radio wave generator (1) to transmit the "dummy frame" a predetermined time (a) before the radio wave generator (1) generates the "radio wave".

When the radio wave generator (1) is a microwave oven, the radio wave generator (1) controls the magnetron that serves as the source of the radio wave to oscillate the radio wave in a half period and stop the radio wave in the other half period based on the commercial power source frequency (50 Hz or 60 Hz) as shown in FIGS. 8(A) and (B), for example.

For that purpose, the radio wave generator (1) controls itself to previously recognize the radio wave generating duration during which the radio wave is generated from the magnetron and transmit the dummy frame the predetermined time ($\alpha$) before the radio wave is generated from the magnetron as shown in FIG. 8(C).

As the result, the radio wave generator (1) can prevent the occurrence of collision of the wireless LAN frames by preventing the occurrence of radio interference between the radio wave generator (1) and the wireless devices (AP, STA).

The above-described predetermined time ($\alpha$) can be set and changed to any value if only the time allows the radio wave generator (1) to generate the "radio wave" sequentially after transmitting the "dummy frame" as shown in FIG. 3.

Although the wireless LAN is applied to the wireless interface of the radio wave generator (1) and The wireless devices (AP, STA) in the above-described exemplary embodiment, the wireless standard is not limited to the wireless LAN and such wireless standards as Bluetooth and ZigBee which use unlicensed bands can be applied to the present invention, if only the wireless standard allows the radio wave generator (1) to generate the "radio wave" sequentially after transmitting the "dummy frame" as shown in FIG. 3 by controlling itself to generate the radio wave after starting the transmission of the dummy frame.

The radio wave generator (1) can also be applied to Bluetooth devices, ZigBee devices, cordless phones and the like as well as microwave ovens.

The control operations performed in the devices such as the radio wave generator (1), the wireless base station (AP), the wireless LAN terminal (STA) and the like that constitute the wireless communication system in the above-described exemplary embodiments can be performed by a hardware device, a software program or a combination thereof.

The processing can be executed by a software program in such a way as the program having the processing sequence written therein is installed in a memory of a computer that is incorporated in a dedicated hardware device and executed or the program is installed in a general purpose computer that can execute various types of processing and executed.

The program may be recorded in such a recording medium as a hard disk or a ROM (Read Only Memory) in advance, for example. Alternatively, the program may be temporarily or permanently stored (recorded) in such a removable recording medium as a floppy disk (registered trademark), a CD-ROM (Compact Disc Read Only Memory), an MO (Magneto optical) disk, a DVD (Digital Versatile Disc), a magnetic disk, and a semiconductor memory.

Such a removable recording medium can be provided as a so-called package software program.

The program may be installed in a computer from the above-described removable recording medium, wirelessly transferred to a computer from a download site, or transferred to a computer through cables via a network such as a LAN (Local Area Network) and the Internet so that the computer can receive the transferred program and install the program in such a recording medium as an internal hard disk.

The processes may be programmed not only to be executed in a time series according to the above-described processing operations but also to be executed in parallel or individually to meet the throughput of the device to execute the processes or as required.

The wireless communication system described in the exemplary embodiments may be constructed in a structure of a logical set of a plurality of devices or in a combination of functions of various devices.

According to the description of the exemplary embodiment, the exemplary embodiment is characterized as below.

The radio wave generator of the exemplary embodiment is A radio wave generator that uses at least a radio wave in a frequency band that overlaps a frequency band used by a wireless standard, characterized by including: dummy frame transmit means that transmits a dummy frame conforming to the wireless standard to a wireless device near the radio wave generator before the radio wave generator generates the radio wave in the frequency band that overlaps the frequency band used by the wireless standard.

The radio wave generator of the exemplary embodiment is characterized by including: radio wave generation control means that controls generation of the radio wave, wherein the radio wave generation control means controls to generate the radio wave after the transmission of the dummy frame is started.

The radio wave generator of the exemplary embodiment is characterized in that the radio wave generation control means includes: control signal transmission means that transmits a control signal for starting the transmission of the dummy frame to the dummy frame transmit means before the generation of the radio wave is started; and respond signal receive means that receives a respond signal indicating that the transmission of the dummy frame is started from the dummy frame transmit means, wherein the radio wave generation control means controls to generate the radio wave when the respond signal receive means receives the respond signal.

The radio wave generator of the exemplary embodiment is characterized in that the dummy frame transmit means transmits the dummy frame when the dummy frame transmit means receives the control signal, and transmits the respond signal to the radio wave generation control means after the dummy frame transmit means transmits the dummy frame.

The radio wave generator of the exemplary embodiment is characterized by including: previous notice frame transmit means that transmits a previous notice frame including information indicating that the dummy frame is to be transmitted to the wireless device in the form of wireless standard frame before the dummy frame is transmitted.

The radio wave generator of the exemplary embodiment is characterized in that the previous notice frame transmit means transmits the previous notice frame including information on time when the transmission of the dummy frame starts to the wireless device.

The radio wave generator of the exemplary embodiment is characterized in that the previous notice frame transmit means transmits the previous notice frame including information on a frequency band of the radio wave generated from the radio wave generator or on a wireless channel corresponding to the frequency band to the wireless device.

The radio wave generator of the exemplary embodiment is characterized in that the dummy frame transmit means transmits the dummy frame to the coverage of the radio wave that is generated from the radio wave generator.

The radio wave generator of the exemplary embodiment is characterized in that the previous notice frame transmit means transmits the previous notice frame to the coverage of the radio wave that is generated from the radio wave generator.

The wireless communication system of the exemplary embodiment is A wireless communication system including a radio wave generator that uses at least a radio wave in a frequency band that overlaps a frequency band used by a wireless standard, and a wireless device that uses a radio wave conforming to the wireless standard, characterized in that the radio wave generator includes: dummy frame transmit means that transmits a dummy frame conforming to the wireless standard to the wireless device near the radio wave generator before the radio wave generator generates the radio wave in the frequency band that overlaps the frequency band used by the wireless standard, and the wireless device includes: control means that controls to stop using the radio wave in a frequency band that has radio interference caused by the radio wave that is generated from the radio wave generator while the wireless device receives the dummy frame.

The wireless communication system of the exemplary embodiment is characterized in that the radio wave generator comprises radio wave generation control means that controls to generate the radio wave after the transmission of the dummy frame is started, and after receiving the dummy frame, the wireless device controls to stop using the radio wave in the frequency band that has radio interference caused by the radio wave that is generated from the radio wave generator while the wireless device is receiving the dummy frame.

The wireless communication system of the exemplary embodiment is characterized in that the radio wave generation control means includes: control signal transmission means that transmits a control signal for starting the transmission of the dummy frame to the dummy frame transmit means before the generation of the radio wave is started; and respond signal receive means that receives a respond signal indicating that the transmission of the dummy frame is started from the dummy frame transmit means, wherein the radio wave generation control means controls to generate the radio wave when the respond signal receive means receives the respond signal.

The wireless communication system of the exemplary embodiment is characterized in that the dummy frame transmit means transmits the dummy frame when the dummy frame transmit means receives the control signal, and transmits the respond signal to the radio wave generation control means after the dummy frame transmit means transmits the dummy frame.

The wireless communication system of the exemplary embodiment is characterized in that the radio wave generator includes: previous notice frame transmit means that transmits a previous notice frame including information indicating that the dummy frame is to be transmitted to the wireless device in the form of wireless standard frame before the dummy frame is transmitted, and the wireless device determines whether or not to perform switch control on a wireless channel when the wireless device receives the previous notice frame.

The wireless communication system of the exemplary embodiment is characterized in that the radio wave generator transmits the previous notice frame including information on time when the transmission of the dummy frame starts to the wireless device, and the wireless device determines whether or not to perform the switch control on the wireless channel based on the information on the start time included in the previous notice frame when the wireless device receives the previous notice frame.

The wireless communication system of the exemplary embodiment is characterized in that the radio wave generator transmits the previous notice frame including information on a frequency band of the radio wave generated from the radio wave generator or on a wireless channel corresponding to the frequency band to the wireless device, and the wireless device recognizes the frequency band of the radio wave that is generated from the radio wave generator or the wireless channel corresponding to the frequency band based on the information on the frequency band or on the wireless channel included in the previous notice frame when the wireless device receives the previous notice frame.

The wireless communication system of the exemplary embodiment is characterized in that the radio wave generator transmits the dummy frame to the coverage of the radio wave that is generated from the radio wave generator.

The wireless communication system of the exemplary embodiment is characterized in that the radio wave generator transmits the previous notice frame to the coverage of the radio wave that is generated from the radio wave generator.

The wireless communication system of the exemplary embodiment is characterized in that the wireless device includes: respond frame transmit means that transmits a respond frame indicating that the previous notice frame has been received to the radio wave generator when the wireless device receives the previous notice frame, and the radio wave generator determines that the previous notice frame has reached the wireless device when the radio wave generator receives the respond frame.

The radio interference prevention control method of the exemplary embodiment is a radio interference prevention control method performed by a radio wave generator that uses at least a radio wave in a frequency band that overlaps a frequency band used by a wireless standard, characterized in that the radio wave generator performs a dummy frame transmit step of transmitting a dummy frame conforming to the wireless standard to a wireless device near the radio wave generator before generating the radio wave in the frequency band that overlaps the frequency band used by the wireless standard.

The radio interference prevention control method of the exemplary embodiment is characterized in that the radio wave generator performs a radio wave generation control step of controlling to generate the radio wave after the transmission of the dummy frame is started at the dummy frame transmit step.

The radio interference prevention control method of the exemplary embodiment is a radio interference prevention control method performed by a wireless communication system including a radio wave generator that uses at least a radio wave in a frequency band that overlaps a frequency band used by a wireless standard, and a wireless device that uses a radio wave conforming to the wireless standard, characterized in that the radio wave generator performs a dummy frame transmit step of transmitting a dummy frame conforming to the wireless standard to the wireless device near the radio wave generator before generating the radio wave in the frequency band that overlaps the frequency band used by the wireless standard, and the wireless device performs a control step of controlling to stop using the radio wave in a frequency band that has radio interference caused by the radio wave that is generated from the radio wave generator when wireless device receives the dummy frame.

The radio interference prevention control method of the exemplary embodiment is characterized in that the radio wave generator performs a radio wave generation control step of controlling to generate the radio wave after the transmission of the dummy frame is started, and after receiving the dummy frame, the wireless device controls to stop using the radio wave in a frequency band that has radio interference caused by the radio wave that is generated from the radio wave generator while the wireless device is receiving the dummy frame.

The radio interference prevention control program of the exemplary embodiment is a radio interference prevention control program executed by a radio wave generator that uses at least a radio wave in a frequency band that overlaps a frequency band used by a wireless standard, characterized by causing the radio wave generator to perform a dummy frame transmitting process of transmitting a dummy frame conforming to the wireless standard to a wireless device near the radio wave generator before the radio wave generator generates the radio wave in the frequency band that overlaps the frequency band used by the wireless standard.

The radio interference prevention control program of the exemplary embodiment is characterized by causing the radio wave generator to perform a radio wave generation control process of controlling to generate the radio wave after the transmission of the dummy frame is started by the dummy frame transmitting process.

This application is based upon and claims the benefit of priority from Japanese patent application No. 2006-188701, filed on Jul. 7, 2006, the disclosure of which is incorporated herein in its entirety by reference.

INDUSTRIAL APPLICABILITY

The radio wave generator, the wireless communication system, the radio interference prevention control method, and the radio interference prevention control program according to the present invention can be applied to a radio wave generator (Bluetooth, Zigbee, microwave oven, cordless phone, or the like) that uses at least a radio wave whose frequency band overlaps a frequency band used by wireless standards for unlicensed band.

DESCRIPTION OF SYMBOLS

STA wireless LAN terminal
AP wireless base station
1 radio wave generator
100 radio wave generating unit
1001 control circuit
1002 drive circuit
1003 magnetron
200 wireless LAN interface
201 control unit
202 previous notice frame generating unit
203 dummy frame generating unit
204 wireless LAN transmit-receive unit

The invention claimed is:

1. A radio wave generator, comprising:
a radio wave generation control unit that controls generation of a radio wave in the same frequency band that overlaps a frequency band used by a wireless standard; and
a dummy frame transmit unit that transmits a dummy frame conforming to the wireless standard, wherein
the radio wave generation control unit controls to start transmitting the dummy frame and then to generate the radio wave in the same frequency band that overlaps the frequency band used by the wireless standard sequentially to the dummy frame if the radio wave generator is to generate the radio wave, and
wherein the radio wave generation control unit comprises:
a control signal transmission unit that transmits a control signal for starting the transmission of the dummy frame to the dummy frame transmit unit before the generation of the radio wave is started; and
a respond signal receive unit that receives a respond signal indicating that the transmission of the dummy frame is started from the dummy frame transmit unit, wherein the radio wave generation control unit controls to generate the radio wave when the respond signal receive unit receives the respond signal.

2. The radio wave generator according to claim 1, characterized in that
the dummy frame transmit unit transmits the dummy frame when the dummy frame transmit unit receives the control signal, and transmits the respond signal to the radio wave generation control unit after the dummy frame transmit unit transmits the dummy frame.

3. The radio wave generator according to claim 1, characterized by comprising:

a previous notice frame transmit unit that transmits a previous notice frame including information indicating that the dummy frame is to be transmitted in the form of wireless standard frame before the dummy frame is transmitted.

4. The radio wave generator according to claim 3, characterized in that the previous notice frame transmit unit transmits the previous notice frame including information on time when the transmission of the dummy frame starts.

5. The radio wave generator according to claim 3, characterized in that the previous notice frame transmit unit transmits the previous notice frame including information on a frequency band of the radio wave generated from the radio wave generator or on a wireless channel corresponding to the frequency band.

6. The radio wave generator according to claim 3, characterized in that the previous notice frame transmit unit transmits the previous notice frame to the coverage of the radio wave that is generated from the radio wave generator.

7. The radio wave generator according to claim 1, characterized in that the dummy frame transmit unit transmits the dummy frame to the coverage of the radio wave that is generated from the radio wave generator.

8. A wireless communication system comprising a radio wave generator that uses at least a radio wave in a frequency band that overlaps a frequency band used by a wireless standard, and a wireless device that uses a radio wave conforming to the wireless standard, characterized in that the radio wave generator comprises:

a radio wave generation control unit that controls generation of the radio wave in the same frequency band that overlaps the frequency band used by the wireless standard; and a dummy frame transmit unit that transmits a dummy frame conforming to the wireless standard, wherein the radio wave generation control unit controls to start transmitting the dummy frame and then to generate the radio wave in the same frequency band that overlaps the frequency band used by the wireless standard sequentially to the dummy frame if the radio wave generator is to generate the radio wave, and wherein the radio wave generation control unit comprises:

a control signal transmission unit that transmits a control signal for starting the transmission of the dummy frame to the dummy frame transmit unit before the generation of the radio wave is started; and a respond signal receive unit that receives a respond signal indicating that the transmission of the dummy frame is started from the dummy frame transmit unit, wherein the radio wave generation control unit controls to generate the radio wave when the respond signal receive unit receives the respond signal.

9. The wireless communication system according to claim 8, characterized in that the dummy frame transmit unit transmits the dummy frame when the dummy frame transmit unit receives the control signal, and transmits the respond signal to the radio wave generation control unit after the dummy frame transmit unit transmits the dummy frame.

10. The wireless communication system according to claim 8, characterized in that the radio wave generator comprises:

a previous notice frame transmit unit that transmits a previous notice frame including information indicating that the dummy frame is to be transmitted to the wireless device in the form of wireless standard frame before the dummy frame is transmitted, and the wireless device determines whether or not to perform switch control on a wireless channel when the wireless device receives the previous notice frame.

11. The wireless communication system according to claim 10, characterized in that the radio wave generator transmits the previous notice frame including information on time when the transmission of the dummy frame starts to the wireless device, and the wireless device determines whether or not to perform the switch control on the wireless channel based on the information on the start time included in the previous notice frame when the wireless device receives the previous notice frame.

12. The wireless communication system according to claim 10, characterized in that the radio wave generator transmits the previous notice frame including information on a frequency band of the radio wave generated from the radio wave generator or on a wireless channel corresponding to the frequency band to the wireless device, and the wireless device recognizes the frequency band of the radio wave that is generated from the radio wave generator or the wireless channel corresponding to the frequency band based on the information on the frequency band or on the wireless channel included in the previous notice frame when the wireless device receives the previous notice frame.

13. The wireless communication system according to claim 10, characterized in that the radio wave generator transmits the previous notice frame to the coverage of the radio wave that is generated from the radio wave generator.

14. The wireless communication system according to claim 10, characterized in that the wireless device comprises:

a respond frame transmit unit that transmits a respond frame indicating that the previous notice frame has been received to the radio wave generator when the wireless device receives the previous notice frame, and the radio wave generator determines that the previous notice frame has reached the wireless device when the radio wave generator receives the response frame.

15. The wireless communication system according to claim 8, characterized in that the radio wave generator transmits the dummy frame to the coverage of the radio wave that is generated from the radio wave generator.

* * * * *